US012632820B2

(12) United States Patent
Martin et al.

(10) Patent No.: US 12,632,820 B2
(45) Date of Patent: May 19, 2026

(54) ADVANCED PREDICTION OF SHIPPING ATTRIBUTES OF A PACKAGE IN A DISPENSING PHARMACY

(71) Applicant: McKesson Corporation, Irving, TX (US)

(72) Inventors: Scott Martin, Mead, CO (US); Juston Oakes, San Angelo, TX (US); Hommy Lopez, Plainfield, IL (US)

(73) Assignee: McKesson Corporation, Irving, TX (US)

( * ) Notice: Subject to any disclaimer, the term of this patent is extended or adjusted under 35 U.S.C. 154(b) by 0 days.

(21) Appl. No.: 17/566,844

(22) Filed: Dec. 31, 2021

(65) Prior Publication Data

US 2023/0214762 A1 Jul. 6, 2023

(51) Int. Cl.
*G06Q 10/08* (2024.01)
*G06Q 10/0834* (2023.01)

(52) U.S. Cl.
CPC .............................. *G06Q 10/08345* (2013.01)

(58) Field of Classification Search
CPC .................................................. G06Q 10/083
See application file for complete search history.

(56) References Cited

U.S. PATENT DOCUMENTS

| | | | |
|---|---|---|---|
| 12,056,650 B2 * | 8/2024 | Reinhardt .......... | G06Q 10/0832 |
| 2004/0149823 A1 * | 8/2004 | Aptekar ............. | G06Q 10/0875 |
| | | | 235/385 |
| 2012/0073241 A1 * | 3/2012 | Mahar .................... | B65B 61/20 |
| | | | 53/55 |
| 2014/0262690 A1 * | 9/2014 | Henderson ............. | B60M 1/346 |
| | | | 198/602 |
| 2015/0371183 A1 * | 12/2015 | Anderson .......... | G06Q 10/0833 |
| | | | 705/333 |
| 2016/0110518 A1 * | 4/2016 | Louie ................... | G06Q 10/087 |
| | | | 705/2 |
| 2017/0351993 A1 * | 12/2017 | Vengalathur Srinath .................... | |
| | | | G09F 3/00 |

OTHER PUBLICATIONS

Czander et al., Pharmaceutical Packaging Operations, 1997, Handbook of Downstream Processing, pp. 309-317 (Year: 1997).*

* cited by examiner

*Primary Examiner* — Christopher Gomez
(74) *Attorney, Agent, or Firm* — Ballard Spahr LLP

(57) ABSTRACT

Technologies are provided for advanced prediction of shipping attributes of a package in a dispensing pharmacy. In some embodiments, a computing system can receive prescription data identifying one or more amounts of respective medications, and can generate, using the prescription data, an estimate of weight of a package containing the one or more amounts of the respective medications. The computing system can then cause, at a time before automated packing of the respective medications into the package, a second computing system to provide shipping data for the package. The shipping data includes first data defining a shipping label. The second computing system can be remotely located relative to the computing system. The computing system can receive the shipping data at a second time before the automated packing of the respective medications into the package, and also can store the shipping data in a storage device.

20 Claims, 6 Drawing Sheets

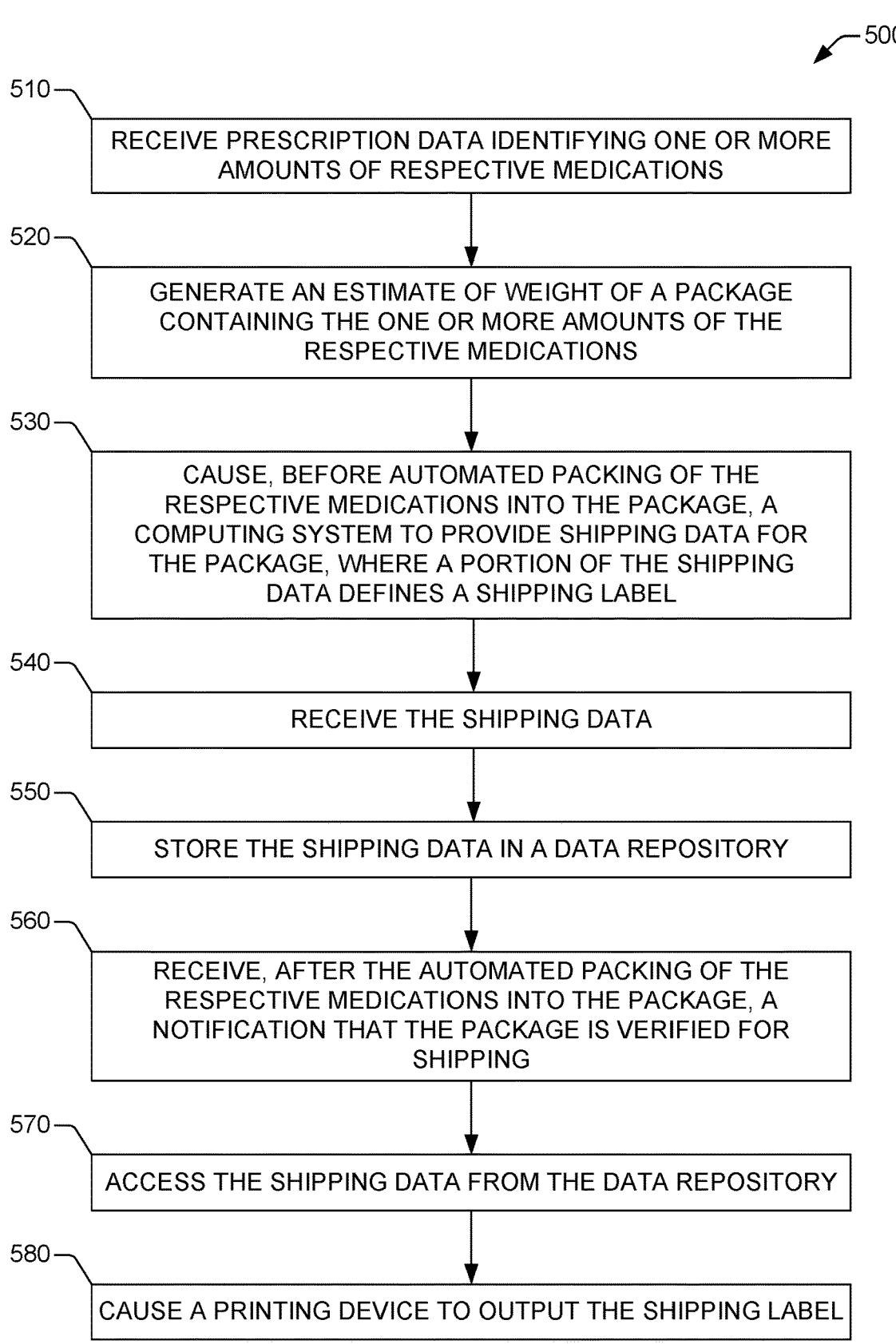

510 — RECEIVE PRESCRIPTION DATA IDENTIFYING ONE OR MORE AMOUNTS OF RESPECTIVE MEDICATIONS

520 — GENERATE AN ESTIMATE OF WEIGHT OF A PACKAGE CONTAINING THE ONE OR MORE AMOUNTS OF THE RESPECTIVE MEDICATIONS

530 — CAUSE, BEFORE AUTOMATED PACKING OF THE RESPECTIVE MEDICATIONS INTO THE PACKAGE, A COMPUTING SYSTEM TO PROVIDE SHIPPING DATA FOR THE PACKAGE, WHERE A PORTION OF THE SHIPPING DATA DEFINES A SHIPPING LABEL

540 — RECEIVE THE SHIPPING DATA

550 — STORE THE SHIPPING DATA IN A DATA REPOSITORY

560 — RECEIVE, AFTER THE AUTOMATED PACKING OF THE RESPECTIVE MEDICATIONS INTO THE PACKAGE, A NOTIFICATION THAT THE PACKAGE IS VERIFIED FOR SHIPPING

570 — ACCESS THE SHIPPING DATA FROM THE DATA REPOSITORY

580 — CAUSE A PRINTING DEVICE TO OUTPUT THE SHIPPING LABEL

FIG. 5

ADVANCED PREDICTION OF SHIPPING ATTRIBUTES OF A PACKAGE IN A DISPENSING PHARMACY

SUMMARY

It is to be understood that both the following general description and the following detailed description are illustrative and explanatory only and are not restrictive.

In one embodiment, the disclosure provides a computing system. The computing system includes at least one processor; and at least one memory device having processor-executable instructions stored thereon that, in response to execution by the at least one processor, cause the computing system to receive prescription data identifying one or more amounts of respective medications; and generate, using the prescription data, an estimate of weight of a package containing the one or more amounts of the respective medications. The processor-executable instructions, in response to execution by the at least one processor, also cause the computing system to cause, at a time before automated packing of the respective medications into the package, a second computing system to provide shipping data for the package. The shipping data comprises first data defining a shipping label. The second computing system is remotely located relative to the computing system. The processor-executable instructions, in response to execution by the at least one processor, further cause the computing system to receive the shipping data at a second time before the automated packing of the respective medications into the package; and store the shipping data in a storage device.

In another embodiment, the disclosure provides a computer-implemented method. The computer-implemented method includes receiving, by a dispensing pharmacy system, prescription data identifying one or more amounts of respective medications, and generating, by the dispensing pharmacy system, using the prescription data, an estimate of weight of a package containing the one or more amounts of the respective medications. The computer-implemented method also includes causing, by the dispensing pharmacy system, at a time before or during automated packing of the respective medications into the package, a second computing system to provide shipping data for the package. The shipping data comprises first data defining a shipping label. The second computing system is remotely located relative to the dispensing pharmacy system. The computer-implemented method further includes receiving the shipping data by the dispensing pharmacy system at a second time before the automated packing of the respective medications into the package; and storing, by the dispensing pharmacy system, the shipping data in a storage device.

In yet another embodiment, the disclosure provides a computer-program product. The computer-program product includes at least one computer-readable non-transitory storage medium having processor-executable instructions stored thereon that, in response to execution, cause a computing system to receive prescription data identifying one or more amounts of respective medications; and generate, using the prescription data, an estimate of weight of a package containing the one or more amounts of the respective medications. The processor-executable instructions, in response to execution, also cause the computing system to cause, at a time before automated packing of the respective medications into the package, a second computing system to provide shipping data for the package. The shipping data comprises first data defining a shipping label. The second computing system is remotely located relative to the dispensing pharmacy system. The processor-executable instructions, in response to execution, further cause the computing system to receive the shipping data at a second time before the automated packing of the respective medications into the package; store the shipping data in a storage device.

Additional elements or advantages of this disclosure will be set forth in part in the description which follows, and in part will be apparent from the description, or may be learned by practice of the subject disclosure. The advantages of the subject disclosure can be attained by means of the elements and combinations particularly pointed out in the appended claims.

This summary is not intended to identify critical or essential features of the disclosure, but merely to summarize certain features and variations thereof. Other details and features will be described in the sections that follow. Further, both the foregoing general description and the following detailed description are illustrative and explanatory only and are not restrictive of the embodiments of this disclosure.

BRIEF DESCRIPTION OF THE DRAWINGS

The annexed drawings are an integral part of the disclosure and are incorporated into the subject specification. The drawings illustrate example embodiments of the disclosure and, in conjunction with the description and claims, serve to explain at least in part various principles, elements, or aspects of the disclosure. Embodiments of the disclosure are described more fully below with reference to the annexed drawings. However, various elements of the disclosure can be implemented in many different forms and should not be construed as limited to the implementations set forth herein. Like numbers refer to like elements throughout.

FIG. 5 illustrates an example of a method for configuring a package for shipping, in accordance with one or more embodiments of this disclosure.

DETAILED DESCRIPTION

Figure 1:
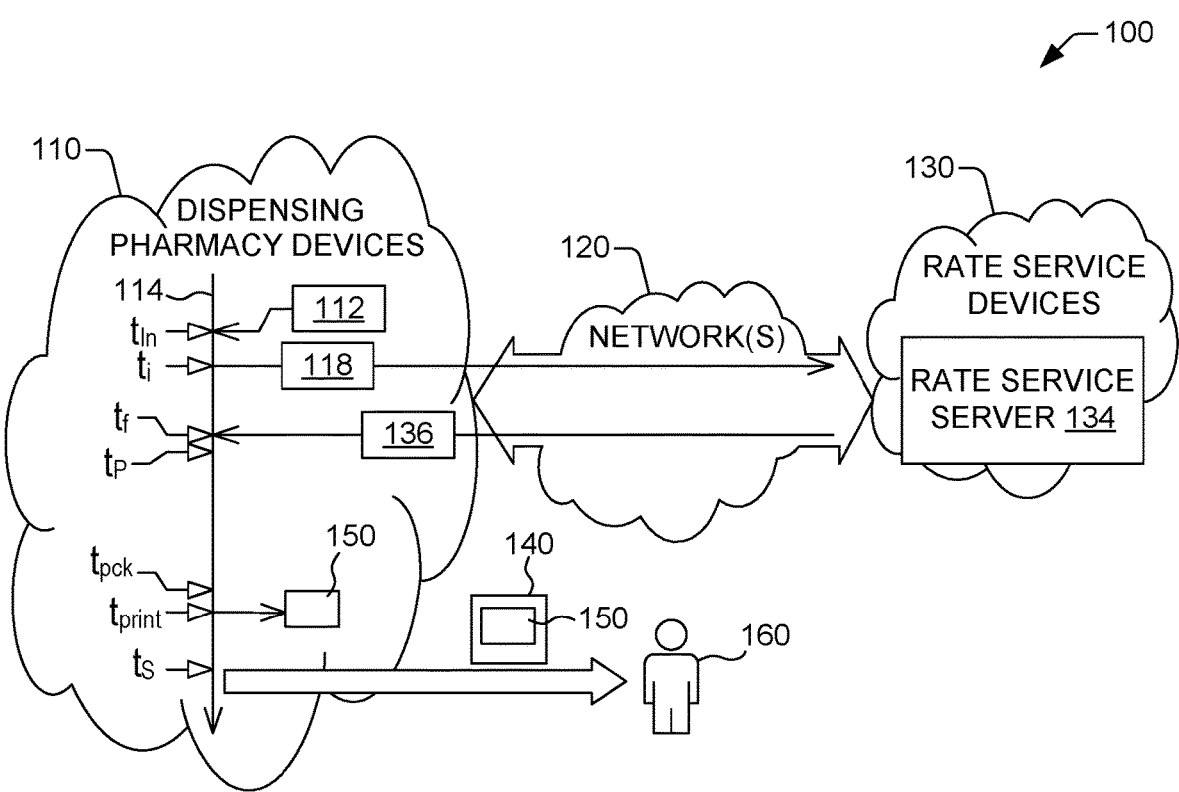
FIG. 1 illustrates an example of an operating environment for prediction of shipping attributes of a package and configuration of the package for shipping, in accordance with one or more embodiments of this disclosure.

The disclosure recognizes and addresses, among other technical challenges, the issue of automated configuration of a package for delivery from a dispensing pharmacy. Dispensing pharmacies, such as mail order pharmacies, fill prescriptions for patients and ship those prescriptions directly to an address of the patients. In many cases the dispensing pharmacy can leverage one of an array of various shipping methods (e.g., different carriers, different shipping durations, etc.). In order to select a satisfactory shipping method in terms of cost and/or delivery time, the dispensing pharmacy can use a third-party rate service. In existing technologies, the use of the third-party rate service introduces undesirable delay within the packing process flow that results in delivery of the package from the dispensing pharmacy.

Embodiments of this disclosure provide computing systems, computer-implemented methods, and computer program products that, individually or in combination, can eliminate such a delay. To that end, embodiments of the disclosure provide a prediction stage and a packing stage that are decoupled from one another. The prediction stage can precede the packing stage and obtains shipping data, including an electronic shipping label, from a rate service. Obtaining the shipping data in the predictive stage can be referred to as "Advanced Predictive Manifesting," for the sake of nomenclature. That shipping data is appropriate for a package containing prescribed medication(s) and/or prescribed supplies associated with at least one of the medication(s). The prescribed medication(s) can include tablets, capsules, liquids, unit-of-use packages, a combination thereof, or the like. The packing stage fills a package with the prescribed medication(s) and use the shipping data previously obtained in the prediction stage. After contents of the package are verified the electronic shipping label can be printed and applied to the package. The package is then released for sortation and shipping.

Although embodiments of this disclosure are described with reference to prescribed medications, the disclosure is not limited in that respect. Indeed, the principles and practical applications of this disclosure also can be implemented for packages containing prescribed medications and supplies associated with one or more of the medications. Thus, embodiments of this disclosure can be implemented in cases where a prescription identifies a medication and one or more supplies associated with the medication. Supplies can include, for example, syringes or a sharps container for safe disposal of syringes. In those cases, a dispensing pharmacy can ship a package containing both the medication and supplies to a patient. Advanced predictive manifesting in accordance with this disclosure also can be implemented for such a package.

In sharp contrast to existing technologies, by decoupling interaction with the rate service from the packing stage to fill, verify, and label a package for shipping, embodiments of this disclosure eliminate delay associated with obtaining a shipping label for the package. As a result, interruption associated with communication with the rate service is absent from a package verification and release step within a packing flow for a packing operator. Because such an interruption is absent, embodiments of this disclosure can perform such a packing flow with greater efficiency than commonplace packing approaches. Accordingly, the greater efficiency of embodiments of this disclosure can permit packing a larger number of packages per hour. Hence, a greater number of packages can be packed in a shift at the dispensing pharmacy or the number of human resources can be reduced for a same number of packages per shift.

With reference to the drawings, FIG. 1 schematically illustrates an example of an operating environment 100 for prediction of shipping attributes of a package and configuration of the package for shipping, in accordance with one or more embodiments of this disclosure. The operating environment 100 includes dispensing pharmacy devices 110 that constitute a dispensing pharmacy, such as a mail order pharmacy or a hub of a central-fill platform. The dispensing pharmacy has the licensure to dispense medications, and also has an NPI number and an NCPDP processor identification number (or BIN). The dispensing pharmacy devices 110 can perform automation processes to fulfill prescription fill requests and ship a package containing one or multiple medications to a destination address (e.g., a dwelling of a subject, a nursing home, an assisted-living facility, or similar). The prescription fill requests include requests for new prescriptions and prescription refills. As mentioned, while described in connection with medication(s), the operating environment 100 also can be operated for prediction of shipping attributes of a package containing one or more supplies associated with at least one medication also shipped within the package.

One of the dispensing pharmacy devices 110 can receive a prescription fill request 112 to be fulfilled. The prescription fill request 112 can include prescription data identifying one or more amounts of respective medications. The prescription data also can identify a shipping address and/or a delivery deadline. An automation process to fulfill the prescription fill request 112 has an automation timeline 114 during which a group of the dispensing pharmacy devices 110 can automatically perform several operations to package one or multiple medications into a delivery package 140 and to supply the delivery package 140 for shipment.

Figure 2:
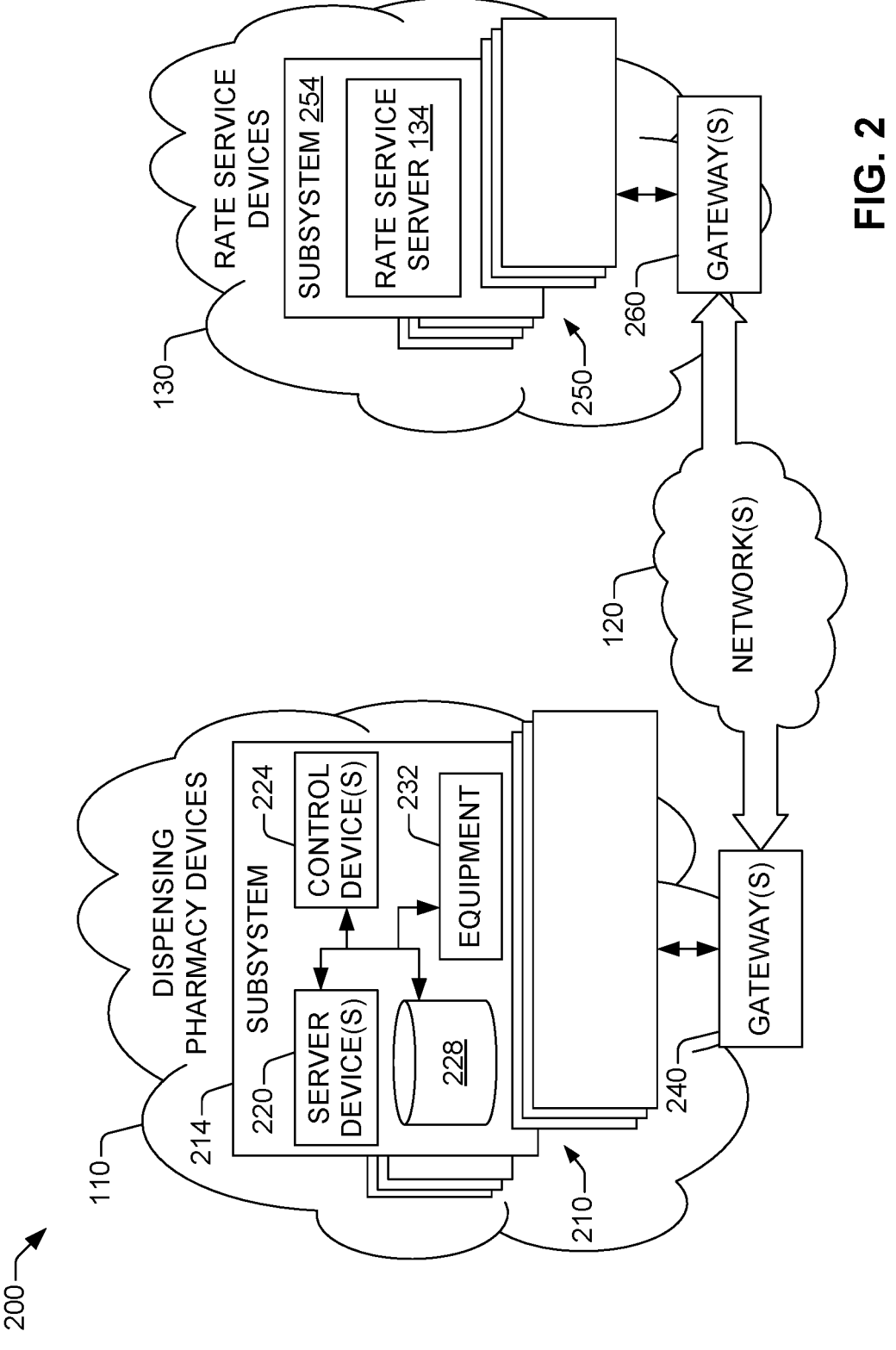
FIG. 2 illustrates an example of an architecture of the operating environment shown in FIG. 1, in accordance with one or more embodiments of this disclosure.

To implement such an automation process, as is illustrated in FIG. 2, the dispensing pharmacy devices 110 can include multiple subsystems 210 and one or multiple gateways 240. At least one of the gateway(s) 240 can be functionally coupled to one or more of the multiple subsystems 210. A gateway of the gateway(s) 240 can receive prescription fill requests and can route the prescription fill requests to an intake subsystem included in the multiple subsystems 210. Several of the subsystems 210 can include components that can implement an automation process to fulfill a prescription request. The subsystem 214 shown in FIG. 2 illustrates an example of such subsystems. The subsystem 214 includes one or multiple server devices 220 that can administer the automation process. The subsystems 214 also includes one or multiple memory devices 228 (which can be referred to as data storage 228). Although the data storage 228 is illustrated as being external to the server device(s) 220, there are configurations where at least a portion of the data storage 228 is integrated into at least one of the server device(s) 220. The subsystem 214 further includes one or multiple control devices 224 and equipment 232. The equipment 232 can include hoppers, conveyance systems, camera devices, weight scales, radio-frequency identification (RFID) reader devices, printing devices, and similar equipment. The control device(s) 224 can control the operation of at least some of the equipment 232 in order to execute the automation process. A bus architecture (represented by connected arrows) permit exchanging data and/or signaling among the server device(s) 220, the control device(s) 224, the equipment 232, and the data storage 228.

With further reference to FIG. 1, a gateway (not depicted) can receive the prescription fill request 112 at an intake time $t_{In}$. The gateway can route the prescription fill request 112 to a server device (e.g., one of the server device(s) 220 (FIG. 2)). Using the prescription data within the prescription fill request 112, the server device can generate an estimate of weight of a package containing the one or more amounts of respective medications identified by the prescription data. That server device can be referred to as a predictor server device.

To generate the estimate of the weight of the package, the predictor server device can identify one or more receptacles suitable to fit the amount(s) of the respective medications identified by the prescription data. Identifying the receptacle(s) can include determining one or more types of receptacles and number of receptacle(s). The predictor server device can then access a database, for example, to determine respective weights of the one or more types of receptacles. For each type of receptacle that has been determined, the predictor server device can then determine a net weight of one or more receptacles of a particular type. In addition, based on the medication(s) identified in the prescription data, the predictor server device also can access the database to identify a weight of a capsule or tablet and/or a specific weight of a liquid. The predictor server device can then determine a net weight of tablets, capsules, and/or liquids corresponding to one or more amounts of respective medications. In case of a liquid, the amount of medication can be prescribed in terms of a volume. The net weight of the prescribed amount of liquid can be determined using the specific weight of the liquid and the volume. In scenarios where the prescription data within the prescription fill request 112 includes data identifying one or more unit-of-use packages, the predictor server device can determine a net weight of the unit-of-use package(s) by accessing the database to determine respective weights of the prescribed unit-of-use package(s). A unit-of-use package can include, for example, a blister pack, a metered-dose inhaler, a course-of-therapy vial, or the like. The prescribed unit-of-use-packages can be of the same type (e.g., two metered-dose inhalers) or can include a combination of packages of different types (e.g., a metered-dose inhaler and a blister pack). Further, the predictor server device also includes other weights to the estimate, such as the weight of the material that forms the package, and in some cases, weight of packing elements that may be present in the package for purposes of preserving the contents of the package in a desired state and/or providing stability. Hence, in some cases, the predictor server device can generate the estimate of the weight of the package containing the one or more amounts of respective medications by adding the net weight of the one or more receptacles of a particular type, for each type; the net weight of tablets, capsules, and/or liquids corresponding to one or more amounts of respective medications; and the weight of the package without prescribed contents (that is, weight of a box and weight of packing element(s) within the box, for example). In cases where one or more unit-of-use packages are prescribed instead of, or in addition to, other types of medications, the predictor server device can add the net weight of the unit-of-use package(s) to the estimate of the weight of the package.

By generating the estimate of the weight of the package and having access to other shipping attributes corresponding to the prescription fill request 112, the predictor server device can search for a satisfactory shipping service in terms of satisfactory cost and delivery timeframe to ship the delivery package 140. To that end, the predictor server device can use a rate service. The rate service can be a cloud-hosted service, in some embodiments, and can be provided by rate service devices 130. As is illustrated in FIG. 1, the rate service devices 130 can be remotely located relative to the dispensing pharmacy. The rate service devices 130 can include a rate service server 134 that can determine a solution to a rate search problem with respect to the estimated weight of the package and one or more other shipping attributes corresponding to the shipping package. Solving such a rate search problem can determine a satisfactory shipping provider amongst various shipping providers.

A solution to that rate search problem defines shipping data corresponding to the satisfactory shipping service. The shipping data can define one or multiple shipping attributes. As such, the shipping data can include first data defining an electronic shipping label for a desired package to be delivered. As is illustrated in FIG. 2, the rate service devices 130 can include multiple subsystems 250 and one or more gateways 260. A subsystem 254 can include the rate service server 134. In some embodiments, more than one of the subsystems 250 can include the rate service server 134.

Referring again to FIG. 1, to obtain shipping data for the package containing the one or more medications identified by the prescription fill request 112, the predictor server device can cause the rate service server 134 to provide such shipping data. To that end, the predictor server device can establish a call session with the rate service server 134 at a time $t_i$ before automated packing of the one or more medications into the package 140. Upon establishing the call session, or after the call session has been established, the predictor server device can send, via the call session, a query message 118 for the shipping data to the rate service server 134. One or more networks 120 can permit establishing the session call and transporting the query message 118 to a gateway that can route the query message to rate service server 134. The network(s) 120 can include wireless network(s), wireline network(s), or a combination of such networks.

The query message 118 can include payload data identifying shipping attributes corresponding to the package 140. The shipping attributes can include one or a combination of a first attribute identifying the estimate of the weight of the package 140, a second attribute identifying the respective medications, a third attribute identifying a shipping address, or a fourth attribute identifying a delivery deadline.

The rate service server 134 can determine a solution to the rate search problem to determine a satisfactory shipping provider amongst various shipping providers. That solution includes shipping data requested for the package 140. In response to determining such a solution, the rate service server 134 can send a response message 136 to the predictor server device, where the response message 136 includes the shipping data. To that end, the rate service server 134 can route the response message 136 via a gateway (e.g., one of the gateway(s) 260) that can send the response message 136 to the predictor server device via the network(s) 120.

The predictor server device can receive the response message 136, and the shipping data therein, at a time $t_f$ after $t_i$ and still before the automated packing of the one or more medications into the package 140. The magnitude of the time interval $t_f$-$t_i$ to obtain the response message 136 can depend on various factors, such as network traffic, network bandwidth, or the like. In some cases the time interval $t_f$-$t_i$ can span several seconds (e.g., 5 s, 10 s, 15 s). The response message 136 can be received by means of a pharmacy gateway (one of the gateway(s) 240 (FIG. 2), for example).

In response to receiving the response message 136, the predictor server device can store the shipping data in a data repository (e.g., data storage 228 (FIG. 2)). In some embodiments, the data repository can be integrated into a pharmacy server device that can administer the automated packing of medications within the dispensing pharmacy. In one example, that pharmacy server device can be embodied in one of the server device(s) 220. In other embodiments, the data repository can be functionally coupled to that pharmacy server device such that latency for data transfer between the pharmacy server device and the data repository can be maintained within a satisfactory level. Configurations having latency that is less than or similar to two seconds can provide satisfactory data transfer between the pharmacy server device and the data repository.

By receiving the response message 136, data defining a shipping label for the package 140 become available to the dispensing pharmacy system. Thus, the shipping label can be ready to be printed and applied to the package 140, without further communication across the network(s) 120, after completion of the automated packing of the one or more medications into the package 140. It is noted that the advanced predictive manifesting also can be applied to other packing modalities, such as semi-automated packing. Those other modalities also can benefit from the shipping label being ready to be printed and applied to the package 140.

The pharmacy server device that administers the automated packing of medications can initiate the automated packing of the one or more amounts of respective medications identified by the prescription fill request. Such an automated packing can be initiated at a time $t_p$ after $t_f$. The automated packing of the one or more amounts of respective medications can proceed until a completion time $t_{pck}$ when the assembly of the package 140 is complete. After such a completion time, the assembled package 140 can be verified for shipping.

In response to being verified, the pharmacy server device can receive a notification (an interrupt signal, for example) that the package is verified for shipping. The notification can be received after the automated packing of the one or more amounts of respective medications into the package 140 is complete. The pharmacy server device can then access the shipping data from the data repository in response to receiving the notification. In embodiments in which the data repository is integrated into the pharmacy server device, the pharmacy server device can receive the notification and can then read the shipping data from the data repository.

Receiving the shipping data can cause the pharmacy server device to direct a printing device (not depicted in FIG. 1) to output the shipping label 150. Outputting the shipping label 150 includes printing indicia defining the shipping label on a solid medium. The printing device can be embodied in, for example, a thermal printer configured to print single-size labels or multi-size labels. The time at which the shipping label 150 is printed is denoted by $t_{print}$ in FIG. 1. After $t_{print}$, the shipping label 150 can be applied to the package 140. The labeled package 140 can then be released for transportation to sortation equipment and a shipping bay for subsequent shipping. For instance, the labeled package 140 can be released to conveyance equipment that can move the labeled packaged 140 to the sortation equipment and shipping bay. The labeled package 140 can then be shipped to a patient 160. In FIG. 1, shipping is depicted with a straight arrow towards the patient 150.

In an example scenario, the notification can be embodied in an interrupt signal that causes the pharmacy server device to read the shipping data for the package 140. The result signal can be generated by a peripheral device integrated into or otherwise coupled to the pharmacy server device. In some cases, the peripheral device can be a touch-screen display device and the result signal can be generated in response to a touch of a selectable user-interface element the represents a verified condition of a package. After reading the shipping data, the pharmacy server device can cause the printing device to output the shipping label 150 using the shipping data.

In sharp contrast to existing technologies, because shipping data defining the shipping label 150 is obtained before filling the package 140 with one or multiple medications, verification of package contents and generation of the shipping label 150 can proceed without delay associated with obtaining shipping data defining the shipping label 150. In other words, the time interval $t_f$-$t_i$ elapsed when obtaining the shipping data defining the shipping label 150 can be avoided after the package 150 has been filled with the one or several medications identified by the prescription fill request 112. As a result, the efficiency of the packing process flow to fill and label the package 140 can be improved relative to existing packing approaches.

Figure 3A:
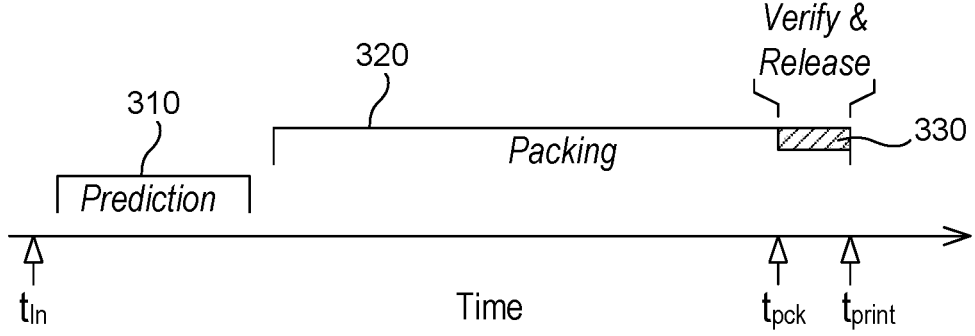
FIG. 3A illustrates an example of temporal order of a prediction stage and a packing stage for a package, in accordance with one or more embodiments of this disclosure.

FIG. 3A summarizes the temporal order of a prediction stage 310 and a packing stage 320, in accordance with one or more embodiments of this disclosure. During the prediction stage 310, the predictor server device, or another server device of the dispensing pharmacy, can generate of estimate of weight of a package containing one or more amounts of respective medications. In addition, a pharmacy server device or another server device of the dispensing pharmacy, can obtain data defining a shipping label for the package and other data defining other shipping attributes for the package. As is described herein, the prediction stage 310 can span a time interval $t_f$-$t_i$ (see FIG. 1). It is noted that the prediction stage also can be applied to a package containing one or more supplies associated with a medication also shipped within the package.

The prediction stage 310 precedes the packing stage 320. The packing stage 320 can be implemented according to one of various packing modalities, such as automated packing and semi-automated packing. In some cases, a particular packing modality of the packing modalities may include an agent performing the assembly of the package. The agent can be a human operator or an autonomous apparatus. The autonomous apparatus can be embodied in an automated computing device that implements machine-learning techniques in order to make autonomous inferences based on various types of input data, including video data, audio data, structured data, unstructured data, a combination thereof, or similar information.

In some embodiments, in the packing stage 320, automation control devices can control various equipment within the dispensing pharmacy that, as mentioned, can implement an automated packing process to fill a package with one or more multiple medications. Regardless of packing modality, the packing stage 320 includes a verification and release step 330 (represented with a hatched block in FIG. 3A) where the contents of the package can be verified and a shipping label (e.g., shipping label 150 can be generated prior to the package being released for shipping. As mentioned, because the prediction stage 310 yields data defining the shipping label, the verification and release step 330 in embodiments of this disclosure can proceed without interruption associated with obtaining shipping data defining the shipping label for the package.

The verification and release step 330 can include automatically determining a difference between the estimate of the weight of the package assembled during an earlier portion of the packing stage 320 and an actual weight of the package. Accordingly, automatically determining such a difference can include, for example, routing the package to a weigh scale, positioning the package on the weight scale, obtaining one or more measurements of the weight of the package, and moving the package from weight scale. Additionally, automatically determining such a difference can include comparing the measured weight to the estimate of the weight. In some cases, such a comparison can indicate that a magnitude of the difference between the measured weight and the estimated weight exceeds a defined tolerance. The tolerance can be defined as a particular threshold weight (e.g., 1 g, 2 g, 5 g, 10 g, or 15 g) or a threshold percentage change (e.g., 0.5%, 1%, or 2%). Hence, in those cases, the package can be deemed to be unverified, and one or multiple exception handling operations can be performed. For example, the exception handling operation(s) can include routing the package for special handling by a packing agent (e.g., human operator or an autonomous apparatus) to re-do the shipping rate determination, shipping method selection, and shipping label generation and application. In other cases, such a comparison can indicate that a magnitude of the difference between the measured weight and the estimated weight is less than or equal to the defined tolerance. In those cases, the package is deemed to be verified.

Figure 3B:
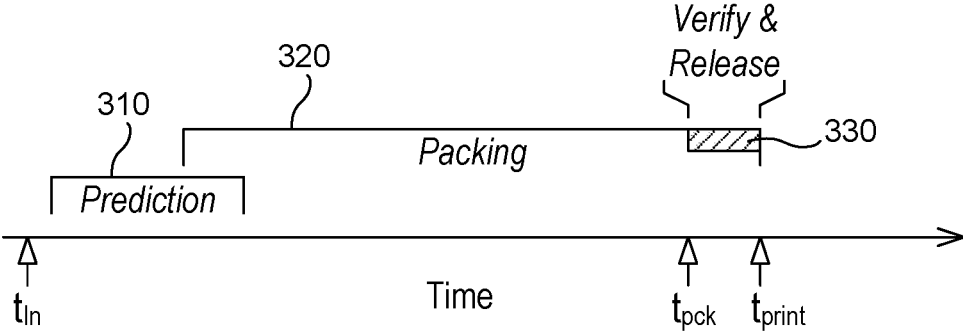
FIG. 3B illustrates another example of temporal order of a prediction stage and a packing stage for a package, in accordance with one or more embodiments of this disclosure.

In some situations, the prediction stage 310 and the packing stage 320 may partially overlap in time domain. For instance, as is illustrated in FIG. 3B, in cases where the time spanned to complete the automated packing of one or more medications into a package is greater than the time interval $t_f$-$t_i$, the automated packing can be initiated before the prediction stage has been completed.

Figure 4:
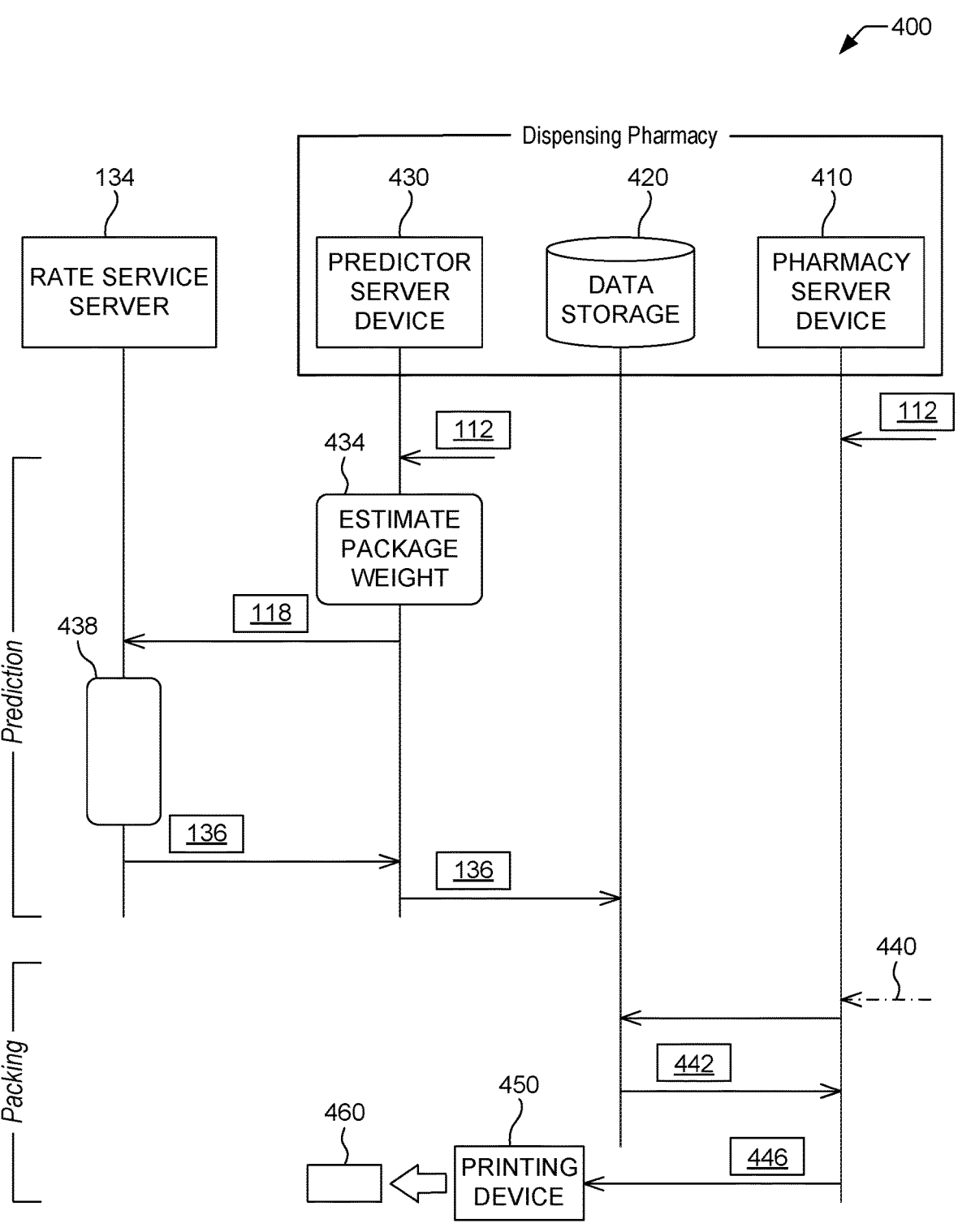
FIG. 4 illustrates an example of a process flow for prediction of shipping attributes of a package and configuration of the package for shipping, in accordance with one or more embodiments of this disclosure.

FIG. 4 illustrates an example of a process flow for prediction of shipping attributes of a package and configuration of the package for shipping, in accordance with one or more embodiments of this disclosure. The pharmacy server device 410, the data storage 420, and the predictor server device 430 constitute a dispensing pharmacy system. The predictor server device 430 can receive the prescription fill request 112 at an intake time. Using the prescription data within the prescription fill request 112, the predictor server device 430 can perform an estimate process 434 that generates an estimate of weight of a package containing the one or more amounts of respective medications identified by the prescription data.

The predictor server device 430 can cause the rate service server 134 to provide such shipping data. To that end, the predictor server device 430 can establish a call session with the rate service server 134 at a time before automated packing of the one or more medications into the package. The predictor server device 430 can send, via the call session, the query message 118 to the rate service server 134.

The rate service server 134 can implement a search process 438 that determines a solution to a rate search problem with respect to the estimated weight of the package and one or more other shipping attributes corresponding to the shipping package. Such a solution defines shipping data corresponding to the satisfactory shipping service. The shipping data can define one or multiple shipping attributes. Accordingly, the shipping data can include first data defining an electronic shipping label for the package containing the one or more amounts of respective medications. In response to determining such a solution, the rate service server 134 can send the response message 136 to the predictor server device 430, where the response message 136 includes the shipping data.

The predictor server device 430 can receive the response message 136, and the shipping data therein, at a second time before the automated packing of the one or more medications into the package has been completed. In response to receiving the response message 136, the predictor server device 430 can store the shipping data in data storage 420. One or multiple storage devices can constitute the data storage 420. Similar to the data storage 228 (FIG. 2), the data storage 420 can be integrated into or otherwise functionally coupled to the pharmacy server device 410 such that latency for data transfer between the pharmacy server device and the data storage 420 can be maintained within a satisfactory level.

Although the pharmacy server device 410 also receives the prescription fill request 112 essentially at the intake time, the pharmacy server device 410 defers the execution of the automated packing process until after the predictor server device 430 has obtained the response message 136 and retained the shipping data within the data storage 420.

Accordingly, after the predictor server device 430 retains the response message within the data storage 420, the pharmacy server device 410 can initiate the automated packing of the one or more amounts of respective medications identified by the prescription fill request 112. As mentioned, the automated packing of the one or more amounts of respective medications can proceed until a completion time (e.g., $t_{pck}$) when the assembly of the package is complete. It is noted that, in some configurations, as is described in connection with FIG. 3B, the automated packing is not deferred and can be initiated prior to the response message being retained in the data storage 420.

After such a completion time, the assembled package 140 can be verified for shipping. Verification can include automatically determining a difference between the estimate of the weight of the assembled package 140 and the actual weight of the assembled package 140, in accordance with aspects described hereinbefore in connection with step 330 (FIG. 3A and FIG. 3B). An accuracy that exceeds a defined tolerance indicates that the assembled package 140 can be deemed unverified. In response to being unverified, one or more exception handling operations can be implemented, as is described herein. In turn, an accuracy that is less than or equal to a defined tolerance, indicates that can be deemed to be verified.

In response to the assembled package 140 being verified, the pharmacy server device 410 can receive a notification 440 (such as an interrupt signal) that the package is verified for shipping. The pharmacy server device 410 can then access the shipping data from the data storage 420. The pharmacy server device 410 can send, to the data storage 420, a request message (such as a control message) for a portion of the shipping data that defines a shipping label for the package. In response, the pharmacy server device 410 can supply a response message 442 that includes payload data defining the shipping label.

Receiving the response message 442 can cause the pharmacy server device 410 to direct a printing device 450 to output the shipping label. To direct the printing device 450 to output the shipping label, the pharmacy server device 410 can send an instruction message 446 having the payload data defining the shipping label. Outputting the shipping label includes printing indicia defining the shipping label on a solid medium 460. Thus, the printed solid medium 460 embodies the shipping label. The printing device 450 can be embodied in, for example, a thermal printer or a laser printer configured to print single-size labels or multi-size labels. The printed solid medium 460 can be configured to be applied to a surface of the package containing the one or more amounts of respective medications identified by the prescription fill request 112. After the solid medium 460 has been applied to the package 140, the labeled package 140 can then be released for shipping.

FIG. 5 illustrates an example of a method 500 for configuring a package for shipping, in accordance with one or more embodiments of this disclosure. The example method 500 includes operations pertaining to predicting shipping attributes of the package and preparing the package for release to conveyance mechanisms that can transport to the package to a shipping bay or similar apparatus in preparation for delivery. While the example method 500 is illustrated with reference to shipping of medications, the disclosure is not limited in that respect. Indeed, the principles and practical applications of this disclosure can be directed to other types items permitted for shipping or otherwise available for shipping from a dispensing pharmacy. For instance, the example method 500 also can be implemented for shipping of a medication and one or more supplies associated with the medication.

A computing system can perform the example method 500 in its entirety or in part. To that end, the computing system includes computing resources that can implement at least one of the blocks included in the example method 500. The computing resources include, for example, central processing units (CPUs), graphics processing units (GPUs), tensor processing units (TPUs), memory, disk space, incoming bandwidth, and/or outgoing bandwidth, interface(s) (such as I/O interfaces or APIs, or both); controller devices(s); power supplies; a combination of the foregoing; and/or similar resources. For instance, the computing system can include programming interface(s); an operating system; software for configuration and or control of a virtualized environment; firmware; and similar resources. In some embodiments, the computing system can embody, or can include, one or a combination of the predictor server device 430, the data storage 420, or the pharmacy server device 410 (FIG. 4). The computing system can be integrated into a dispensing pharmacy and, thus, can be referred to as a dispensing pharmacy system.

At block 510, the dispensing pharmacy system can receive prescription data identifying one or more amounts of respective medications. The prescription data can be contained in a prescription fill request to fill or refill a prescription.

At block 520, the dispensing pharmacy system can generate an estimate of weight of a package containing the one or more amounts of the respective medications. Such an estimate can be generated using the prescription data. In some embodiments, as is described herein, generating the estimate of the weight can include identifying a receptacle to fit a first amount of the one or more amounts of respective medications, and determining a weight of the identified receptacle by accessing a database including a catalogue of receptacles. Generating the estimate of weight also can include determining a weight of the first amount of the one or more amounts of respective medications. Additionally, generating the estimate of the weight further includes adding a weight of the package without prescribed content but including, as applicable, one or more packing elements; the weight of the identified receptacle; and the weight of the first amount of the one or more amounts of respective medications.

As mentioned, in some embodiments, the prescription data can identify one or more unit-of-use packages. Thus, generating the estimate of the weight can include determining respective weights of the unit-of-use package(s) and adding the respective weights to the estimate.

At block 530, the dispensing pharmacy system can cause, at a time before or during automated packing of the respective medications, a computing system to provide shipping data for the package. The shipping data can define one or multiple shipping attributes. A portion of the shipping data includes first data defining an electronic shipping label. The computing system can be remotely located relative to the dispensing pharmacy system. In some embodiments, the computing system can be embodied in, or can include, the rate service server 134 (FIG. 1). In some embodiments, causing the computing system to provide the shipping data can include establishing a call session with the computing system, and sending, via the call session, a query message for the shipping data to the computing system. The query message can include payload data identifying shipping attributes corresponding to the delivery package. The shipping attributes can include one or a combination of a first shipping attribute identifying the estimate of the weight of the delivery package, a second shipping attribute identifying the respective medications, a third shipping attribute identifying a shipping address, or a fourth shipping attribute identifying a delivery deadline.

At block 540, the dispensing pharmacy system can receive the shipping data. The shipping data can be received by means of a pharmacy gateway (one of the gateways 240 (FIG. 2), for example).

At block 550, the dispensing pharmacy system can store the shipping data in a data repository (e.g., data storage 228 (FIG. 2)). As is described herein, in some embodiments, the data repository can be integrated into a server device that can administer the automated packing of medications within the dispensing pharmacy. In other embodiments, the data repository can be functionally coupled to that server device such that latency for data transfer between the server device and the data repository can be maintained within a satisfactory level.

At block 560, the dispensing pharmacy system can receive a notification that the package is verified for shipping. The notification can be received at a second time after the automated packing of the respective medications into the package. At block 570, the dispensing pharmacy system can access the shipping data from the data repository. In embodiments in which the data repository is integrated into the server device that can administer the automated packing of medications within the dispensing pharmacy, that server device receive the notification and can read the shipping data from the data repository.

At block 580, the dispensing pharmacy system can cause a printing device to output the shipping label on a solid medium. The printing device can be embodied in, for example, a thermal printer configured to print single-size labels or multi-size labels. In one example, the printing device can be embodied in the printing device 450 (FIG. 4) and the shipping label can be embodied in the shipping label 460 (FIG. 2).

Figure 6:
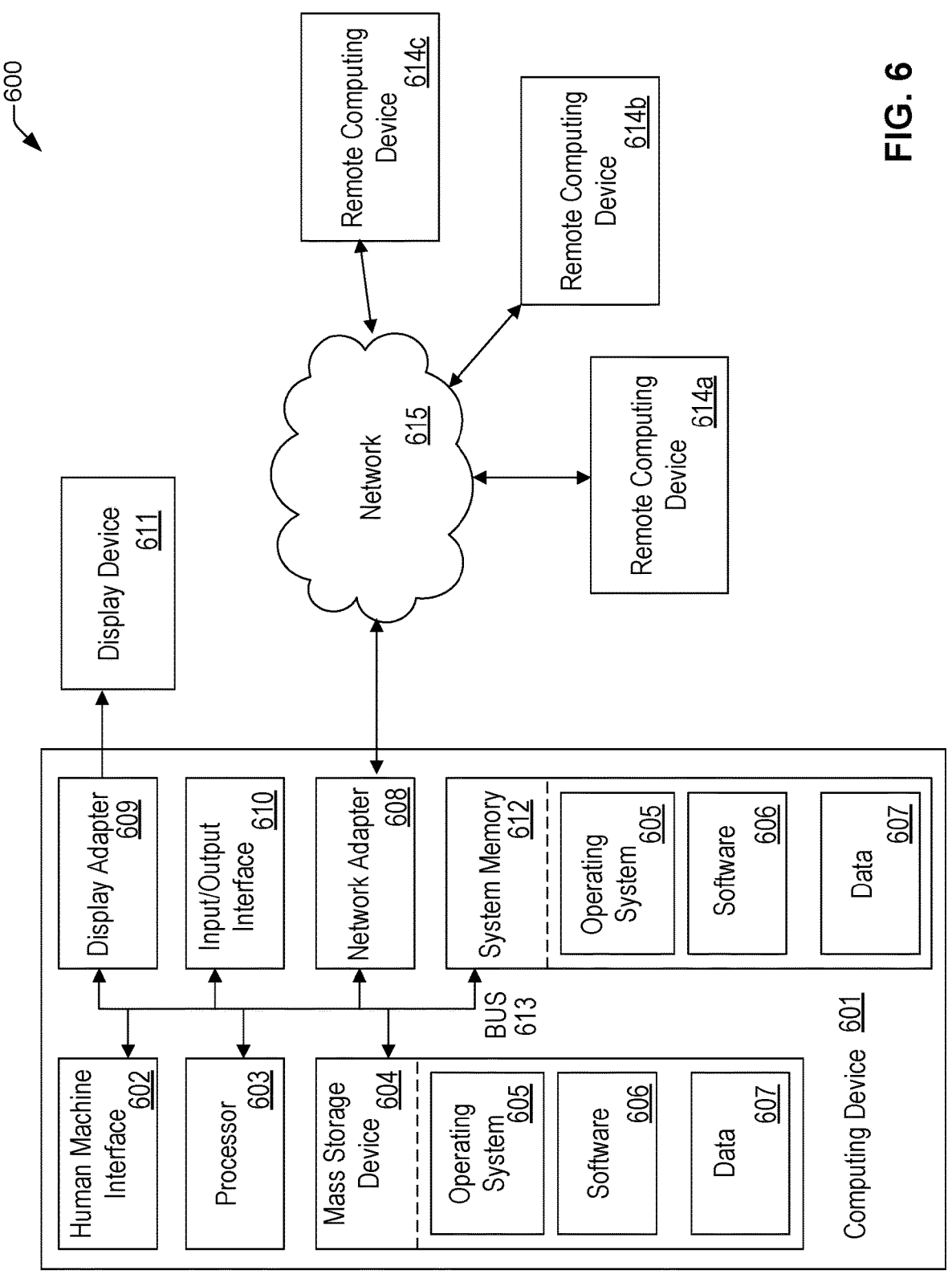
FIG. 6 illustrates an example of another operating environment that can implement prediction of shipping attributes of a package and configuration of the package for shipping, in accordance with one or more embodiments of this disclosure.

In order to provide some context, the computer-implemented method and systems of this disclosure can be implemented on the computing environment illustrated in FIG. 6 and described below. Similarly, the computer-implemented methods and systems disclosed herein can utilize one or more computing devices to perform one or more functions in one or more locations. FIG. 6 is a block diagram illustrating an example of a computing environment 600 for performing the disclosed methods and/or implementing the disclosed systems. The computing environment 600 shown in FIG. 6 is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment. The computing environment 600 shown in FIG. 6 can embody at least a portion of the operating environment 100 (FIG. 1) or the architecture shown in FIG. 2, and can implemented the various functionalities described herein connection with advanced predictive manifesting, For example, a portion of the computing environment 600 can embody the predictor server device 430, the data storage 420, the pharmacy server device 410, and can operate in accordance with aspects described herein. Such a portion of the computing environment 600 can be integrated into a dispensing pharmacy, for example, and thus, can be referred to as a dispensing pharmacy system. A portion of the computing environment 600 also can include the rate service server 134.

The computer-implemented methods and systems in accordance with this disclosure can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed computer-implemented methods and systems can be performed by software components. The disclosed systems and computer-implemented methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and computer-implemented methods disclosed herein can be implemented via a general-purpose computing device in the form of a computing device 601. The components of the computing device 601 can comprise, but are not limited to, one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. The bus 613, and all buses specified in this description can also be implemented over a wired or wireless network connection and each of the subsystems, including the one or more processors 603, a mass storage device 604, an operating system 605, software 606, data 607, a network adapter 608, the system memory 612, an Input/Output Interface 610, a display adapter 609, a display device 611, and a human-machine interface 602, can be contained within one or more remote computing devices 614a,b,c at physically separate locations, connected through buses of this form, in effect implementing a fully distributed system.

The computing device 601 typically comprises a variety of computer-readable media. Exemplary readable media can be any available media that is accessible by the computing device 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the data 607 and/or program modules such as the operating system 605 and the software 606 that are immediately accessible to and/or are presently operated on by the one or more processors 603.

In another aspect, the computing device 601 can also comprise other removable/non-removable, volatile/non-volatile computer storage media. By way of example, FIG. 6 illustrates the mass storage device 604 which can provide non-volatile storage of computer code, computer readable instructions, data structures, program modules, and other data for the computing device 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the software 606. Each of the operating system 605 and the software 606 (or some combination thereof) can comprise elements of the programming and the software 606. The data 607 can also be stored on the mass storage device 604. The data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 603 via the human-machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, the display device 611 can also be connected to the system bus 613 via an interface, such as the display adapter 609. It is contemplated that the computing device 601 can have more than one display adapter 609 and the computing device 601 can have more than one display device 611. For example, the display device 611 can be a monitor, an LCD (Liquid Crystal Display), or a projector. In addition to the display device 611, other output peripheral devices can comprise components such as speakers (not shown) and a printer (not shown) which can be connected to the computing device 601 via the Input/Output Interface 610. Any operation and/or result of the methods can be output in any form to an output device. Such output can be any form of visual representation, including, but not limited to, textual, graphical, animation, audio, tactile, and the like. The display device 611 and computing device 601 can be part of one device, or separate devices.

The computing device 601 can operate in a networked environment using logical connections to one or more remote computing devices 614*a,b,c*. By way of example, a remote computing device can be a personal computer, portable computer, smartphone, a server, a router, a network computer, a peer device or other common network node, and so on. Logical connections between the computing device 601 and a remote computing device 614*a,b,c* can be made via a network 615, such as a local area network (LAN) and/or a general wide area network (WAN). Such network connections can be through the network adapter 608. The network adapter 608 can be implemented in both wired and wireless environments. In an aspect, one or more of the remote computing devices 614*a,b,c* can comprise an external engine and/or an interface to the external engine.

For purposes of illustration, application programs and other executable program components such as the operating system 605 are illustrated herein as discrete blocks, although it is recognized that such programs and components reside at various times in different storage components of the computing device 601, and are executed by the one or more processors 603 of the computer. An implementation of the software 606 can be stored on or transmitted across some form of computer-readable media. Any of the disclosed methods can be performed by computer readable instructions embodied on computer-readable media. Computer-readable media can be any available media that can be accessed by a computer. By way of example and not meant to be limiting, computer-readable media can comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

It is to be understood that the methods and systems described here are not limited to specific operations, processes, components, or structure described, or to the order or particular combination of such operations or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers, or operations. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that serves simply as an example.

Operations and components described herein as being used to perform the disclosed methods and construct the disclosed systems are illustrative unless the context clearly dictates otherwise. It is to be understood that when combinations, subsets, interactions, groups, etc. of these operations and components are disclosed, that while specific reference of each various individual and collective combinations and permutation of these may not be explicitly disclosed, each is specifically contemplated and described herein, for all methods and systems. This applies to all aspects of this application including, but not limited to, operations in disclosed methods and/or the components disclosed in the systems. Thus, if there are a variety of additional operations that can be performed or components that can be added, it is understood that each of these additional operations can be performed and components added with any specific embodiment or combination of embodiments of the disclosed systems and methods.

Embodiments of this disclosure may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices, whether internal, networked, or cloud-based.

Embodiments of this disclosure have been described with reference to diagrams, flowcharts, and other illustrations of computer-implemented methods, systems, apparatuses, and computer program products. Each block of the block diagrams and flowchart illustrations, and combinations of blocks in the block diagrams and flowchart illustrations, respectively, can be implemented by processor-accessible instructions. Such instructions can include, for example, computer program instructions (e.g., processor-readable and/or processor-executable instructions). The processor-accessible instructions can be built (e.g., linked and compiled) and retained in processor-executable form in one or multiple memory devices or one or many other processor-accessible non-transitory storage media. These computer program instructions (built or otherwise) may be loaded onto a general-purpose computer, special purpose computer, or other programmable data processing apparatus to produce a machine. The loaded computer program instructions can be accessed and executed by one or multiple processors or other types of processing circuitry. In response to execution, the loaded computer program instructions provide the functionality described in connection with flowchart blocks (individually or in a particular combination) or blocks in block diagrams (individually or in a particular combination). Thus, such instructions which execute on the computer or other programmable data processing apparatus create a means for implementing the functions specified in the flow-chart blocks (individually or in a particular combination) or blocks in block diagrams (individually or in a particular combination).

These computer program instructions may also be stored in a computer-readable memory that can direct a computer or other programmable data processing apparatus to function in a particular manner, such that the instructions stored in the computer-readable memory produce an article of manufacture including processor-accessible instruction (e.g., processor-readable instructions and/or processor-executable instructions) to implement the function specified in the flowchart blocks (individually or in a particular combination) or blocks in block diagrams (individually or in a particular combination). The computer program instructions (built or otherwise) may also be loaded onto a computer or other programmable data processing apparatus to cause a series of operations to be performed on the computer or other programmable apparatus to produce a computer-implemented process. The series of operations can be performed in response to execution by one or more processor or other types of processing circuitry. Thus, such instructions that execute on the computer or other programmable apparatus provide operations for implementing the functions specified in the flowchart blocks (individually or in a particular combination) or blocks in block diagrams (individually or in a particular combination).

Accordingly, blocks of the block diagrams and flowchart illustrations support combinations of means for performing the specified functions in connection with such diagrams and/or flowchart illustrations, combinations of operations for performing the specified functions and program instruction means for performing the specified functions. Each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

The methods and systems can employ artificial intelligence techniques such as machine learning and iterative learning. Examples of such techniques include, but are not limited to, expert systems, case-based reasoning, Bayesian networks, behavior-based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the computer-implemented methods, apparatuses, devices, and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is in no way intended that an order be inferred, in any respect. This holds for any possible non-express basis for interpretation, including: matters of logic with respect to arrangement of operations or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computing system, comprising:

at least one processor; and at least one memory device having processor-executable instructions stored thereon that, in response to execution by the at least one processor, cause the computing system to:

receive prescription data identifying one or more amounts of respective medications;

determine, using the prescription data, an estimated weight of a package containing the one or more amounts of the respective medications;

cause, at a time before automated packing of the respective medications into the package, a second computing system to provide shipping data for the package, wherein the shipping data comprises first data defining a shipping label, and wherein the second computing system is remotely located relative to the computing system;

receive, by a pharmacy server of the computing system, the shipping data from the second computing system at a second time before the automated packing of the respective medications into the package, wherein the pharmacy server comprises a storage device;

store, via the pharmacy server, the shipping data in the storage device;

in response to storage of the shipping data, cause, via the pharmacy server, execution of the automated packing of the respective medications into the package, wherein the automated packing is executed at least in part via conveyance equipment controlled via the pharmacy server; and in response to at least one user interaction with a peripheral device integrated into or otherwise coupled to the pharmacy server, cause, by the pharmacy server, a shipping label for the package to be output by a printing device and applied to the package, wherein the printing device outputs the shipping label based on the shipping data stored in the storage device of the pharmacy server, wherein the at least one user interaction with the peripheral device causes the pharmacy server to read the shipping data in the storage device, wherein the at least one user interaction is indicated to the pharmacy server after the automated packing of the respective medications into the package is complete, and wherein the package with the shipping label applied thereto is released to the conveyance equipment for subsequent shipping.

2. The computing system of claim 1, the at least one memory device having further processor-executable instructions stored thereon that in response to execution by the at least one processor further cause the computing system to:

receive, at a third time after the automated packing of the respective medications into the package is complete, an interrupt signal indicating the at least one user interaction; and in response to the interrupt signal, access, by the pharmacy server, the shipping data from the storage device.

3. The computing system of claim 2, wherein the interrupt signal indicates the package is verified for shipping, and wherein the at least one user interaction comprises an interaction with a user interface element output by the peripheral device to indicate the package is verified for shipping.

4. The computing system of claim 1, wherein the processor-executable instructions that cause the computing system to cause the second computing system to provide shipping data for the package further cause the computing system to:

establish a call session with the second computing system; and send, via the call session, a query message for the shipping data to the second computing system, the query message comprising payload data identifying shipping attributes corresponding to the package.

5. The computing system of claim 4, wherein the shipping attributes comprise a first attribute identifying the estimated weight of the package, a second attribute identifying the respective medications, and a third attribute identifying a shipping address.

6. The computing system of claim 1, wherein determining, using the prescription data, the estimated weight of the package comprises:

identifying a receptacle to fit a first amount of the one or more amounts of respective medications; and determining a weight of the identified receptacle by accessing a database including a catalogue of receptacles.

7. The computing system of claim 6, wherein determining the estimated weight of the package further comprises determining a weight of the first amount of the one or more amounts of respective medications.

8. The computing system of claim 7, wherein determining the estimated weight of the package further comprises adding a weight of the package, the weight of the identified receptacle, and the weight of the first amount of the one or more amounts of respective medications.

9. A method, comprising:

receiving, by a dispensing pharmacy system, prescription data identifying one or more amounts of respective medications;

determining, by the dispensing pharmacy system, using the prescription data, an estimated weight of a package containing the one or more amounts of the respective medications;

causing, by the dispensing pharmacy system, at a time before automated packing of the respective medications into the package, a second computing system to provide shipping data for the package, wherein the shipping data comprises first data defining a shipping label, and wherein the second computing system is remotely located relative to the dispensing pharmacy system;

receiving, by a pharmacy server of the dispensing pharmacy system, the shipping data from the second computing system at a second time before the automated packing of the respective medications into the package, wherein the pharmacy server comprises a storage device;

storing, via the pharmacy server, the shipping data in the storage device;

in response to storage of the shipping data, causing, via the pharmacy server, execution of the automated packing of the respective medications into the package, wherein the automated packing is executed at least in part via conveyance equipment controlled via the pharmacy server; and in response to at least one user interaction with a peripheral device integrated into or otherwise coupled to the pharmacy server, causing, by the pharmacy server, a shipping label for the package to be output by a printing device and applied to the package, wherein the printing device outputs the shipping label based on the shipping data stored in the storage device of the pharmacy server, wherein the at least one user interaction with the peripheral device causes the pharmacy server to read the shipping data in the storage device, wherein the at least one user interaction is indicated to the pharmacy server after the automated packing of the respective medications into the package is complete, and wherein the package with the shipping label applied thereto is released to the conveyance equipment for subsequent shipping.

10. The method of claim 9, further comprising:

receiving, by the dispensing pharmacy system, at a third time after the automated packing of the respective medications into the package is complete, an interrupt signal indicating the at least one user interaction; and in response to the interrupt signal, accessing, by the pharmacy server, the shipping data from the storage device.

11. The method of claim 10, wherein the interrupt signal indicates the package is verified for shipping, and wherein the at least one user interaction comprises an interaction with a user interface element output by the peripheral device to indicate the package is verified for shipping.

12. The method of claim 9, wherein causing the second computing system to provide shipping data for the package comprises:

establishing a call session with the second computing system; and sending, via the call session, a query message for the shipping data to the second computing system, the query message comprising payload data identifying shipping attributes corresponding to the package.

13. The method of claim 12, wherein the shipping attributes comprise a first attribute identifying the estimated weight of the package, a second attribute identifying the respective medications, and a third attribute identifying a shipping address.

14. The method of claim 9, wherein determining the estimated weight of the package comprises:

identifying a receptacle to fit a first amount of the one or more amounts of respective medications; and determining a weight of the identified receptacle by accessing a database including a catalogue of receptacles.

15. The method of claim 14, wherein determining the estimated weight of the package comprises determining a weight of the first amount of the one or more amounts of respective medications.

16. The method of claim 15, wherein determining the estimated weight of the package comprises adding a weight of the package without prescribed content, the weight of the identified receptacle, and the weight of the first amount of the one or more amounts of respective medications.

17. At least one computer-readable non-transitory storage medium having processor-executable instructions stored thereon that, in response to execution, cause a computing system to:

receive prescription data identifying one or more amounts of respective medications;

determine, using the prescription data, an estimated weight of a package containing the one or more amounts of the respective medications;

cause, at a time before automated packing of the respective medications into the package, a second computing system to provide shipping data for the package, wherein the shipping data comprises first data defining a shipping label, and wherein the second computing system is remotely located relative to the computing system;

receive, by a pharmacy server of the computing system, the shipping data from the second computing system at a second time before the automated packing of the respective medications into the package, wherein the pharmacy server comprises a storage device;

store, via the pharmacy server, the shipping data in the storage device;

in response to storage of the shipping data, cause, via the pharmacy server, execution of the automated packing of the respective medications into the package, wherein the automated packing is executed at least in part via conveyance equipment controlled via the pharmacy server; and in response to at least one user interaction with a peripheral device integrated into or otherwise coupled to the pharmacy server, cause, by the pharmacy server, a shipping label for the package to be output by a printing device and applied to the package, wherein the printing device outputs the shipping label based on the shipping data stored in the storage device of the pharmacy server, wherein the at least one user interaction with the peripheral device causes the pharmacy server to read the shipping data in the storage device, wherein the at least one user interaction is indicated to the pharmacy server after the automated packing of the respective medications into the package is complete, and wherein the package with the shipping label applied thereto is released to the conveyance equipment for subsequent shipping.

18. The at least one computer-readable non-transitory storage medium of claim 17, wherein the processor-executable instructions, in response to further execution, further cause the computing system to:

receive, at a third time after the automated packing of the respective medications into the package is complete, an interrupt signal indicating the at least one user interaction; and in response to the interrupt signal, access, by the pharmacy server, the shipping data from the storage device.

19. The at least one computer-readable non-transitory storage medium of claim 18, wherein the interrupt signal indicates the package is verified for shipping, and wherein the at least one user interaction comprises an interaction with a user interface element output by the peripheral device to indicate the package is verified for shipping.

20. The at least one computer-readable non-transitory storage medium of claim 17, wherein the processor-executable instructions that cause the second computing system to provide the shipping data for the package further cause the computing system to:

establish a call session with the second computing system; and send, via the call session, a query message for the shipping data to the second computing system, the query message comprising payload data identifying shipping attributes corresponding to the package.

* * * * *